United States Patent [19]

Temes et al.

[11] Patent Number: 5,250,954
[45] Date of Patent: Oct. 5, 1993

[54] COLOR-CODED RADAR PLAN POSITION INDICATOR

[75] Inventors: Clifford L. Temes, Alexandria, Va.; George J. Linde, Accokeek, Md.

[73] Assignee: The United States of America as represented by the Secretary of the Navy, Washington, D.C.

[21] Appl. No.: 722,804

[22] Filed: Jun. 28, 1991

[51] Int. Cl.$^5$ ............................................. G01S 7/12
[52] U.S. Cl. ................................................ 342/181
[58] Field of Search ........................................ 342/181

[56] References Cited

U.S. PATENT DOCUMENTS

| | | | |
|---|---|---|---|
| 2,779,017 | 1/1957 | Land et al. | 342/160 |
| 2,814,035 | 11/1957 | Curtis | 342/158 |
| 2,901,747 | 8/1959 | Sunstein | 342/181 |
| 2,911,640 | 11/1959 | Atlas | 342/26 |
| 3,614,720 | 10/1971 | Ludlum | 342/181 X |
| 3,617,997 | 11/1971 | Maas | 342/181 X |
| 3,697,990 | 10/1972 | Emch | 342/123 |
| 3,780,371 | 12/1973 | Rymes | 342/16 |
| 3,845,462 | 10/1974 | Blue et al. | 342/181 X |
| 3,858,209 | 12/1974 | Zulch | 342/109 |
| 3,878,422 | 4/1975 | Brown et al. | 340/772 |
| 3,882,502 | 5/1975 | Peabody et al. | 342/176 |
| 4,179,681 | 12/1979 | Zehner et al. | 342/181 X |
| 4,224,621 | 9/1980 | Cornett et al. | 342/183 |
| 4,249,175 | 3/1981 | Belrose et al. | 342/182 |
| 4,352,105 | 9/1982 | Harney | 342/181 X |
| 4,663,630 | 5/1987 | Numaho et al. | 342/176 |
| 4,932,415 | 6/1990 | Angelsen | 128/661.09 |

Primary Examiner—John B. Sotomayor
Attorney, Agent, or Firm—Thomas E. McDonnell; Edward F. Miles

[57] ABSTRACT

A method to enhance target detectability on a radar plan position indicator is described which includes the receiving of coherent pulse-burst waveforms from a target so that at least one complete burst is included in each dwell of a scanning surveillance fan beam. A fast fourier transform is performed on each returned coherent burst to form Doppler channels in predetermined range cells. The largest signal of the Doppler channels in each range cell is then selected and color coded. The color coded signals are applied to a plan position indicator whereby target images are viewable. Preferably, the Doppler channels are color coded over a rainbow spectrum so that a white background is produced and target images appear as tracks on a microprocessor-based raster-type plan position indicator. A continuity test and threshold test are also utilized so that target velocity and position are determined.

7 Claims, 1 Drawing Sheet

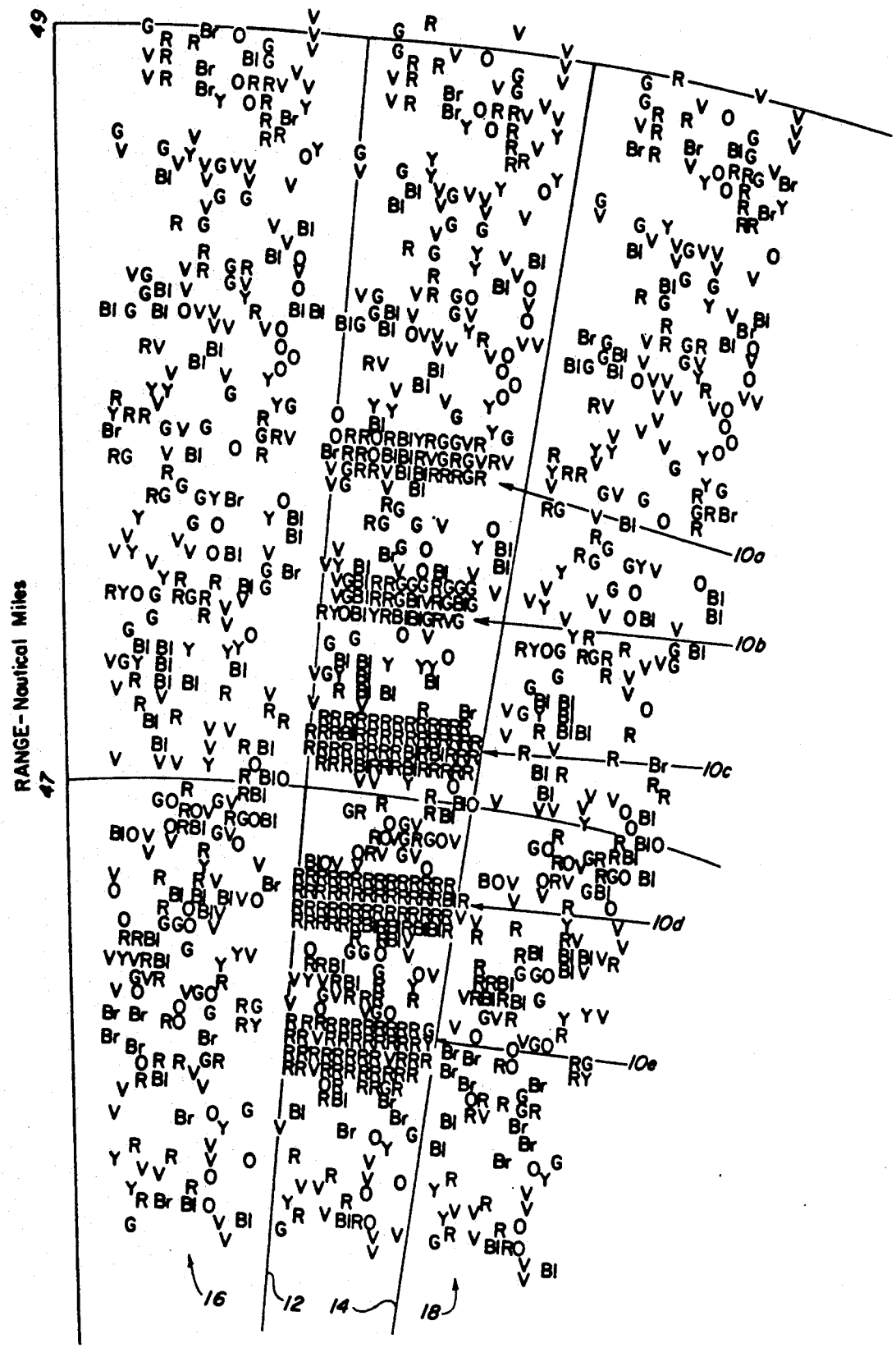

COLOR-CODED RADAR PLAN POSITION INDICATOR

FIELD OF THE INVENTION

The present invention relates generally to radar plan position indicators, and more particularly to a method for enhancing a radar plan position indicator with color coding of target echoes.

BACKGROUND OF THE INVENTION

Radar video output is conventionally displayed by a monochrome plan position indicator. With an automatic tracking system, target velocity can be digitally read out separately. An operator's response currently depends only on the brightness of the target returns. While plan position indicators have historically been monochrome, and in fact early models had no color capabilities, later plan position indicators had limited color capabilities but these were never widely used. In fact, some current plan position indicators are implemented using a raster display (i.e., the SPA-25G, a U.S. Navy raster PPI) which has the potential for good color.

In U.S. Pat. No. 3,882,502 (Peabody et al), a moving target indication display system is disclosed wherein the target display color indicates the speed of the target. The hue of the display target is a function of its speed, and the targets for each stored scan are repetitively displayed in rapid succession so that a moving target is displayed on a CRT as a series of flashing dots on a line of residual light.

In U.S. Pat. No. 3,878,422 (Brown et al), a gas discharge phosphor-containing display which identifies a moving body by color without computer processing is disclosed. This is made possible by utilizing a multiple gaseous discharge display panel so that a color produced by a phosphor and gas discharge at a cell indicates a moving body whose velocity is indicated by the decay time of the phosphor.

In U.S. Pat. No. 3,697,990 (Emch), the use of a plan position indicator display and the gathering and processing of target range and elevation information is disclosed. The elevation and range signals are placed in a hold circuit and are then scaled and displayed on separate devices.

SUMMARY OF THE INVENTION

In accordance with the present invention, a method for enhanced target detectability on a radar plan position indicator includes the displaying of coherent pulse-burst waveforms from a target so that at least one complete burst is included in each dwell of a scanning surveillance fan beam. A fast fourier transform is then performed on each return coherent burst to form Doppler channels in predetermined range cells. The largest signal of the Doppler channels is then selected and color coded. The color coded signal is then applied to the plan position indicator so that the target returns are viewable. The plan position indicator of this invention is a raster-scan (TV-type) color monitor in which colors are selectable by means of processor instructions. It is generally assumed that intensity modulation of amplitude is preserved, although this is not absolutely essential to a color implementation.

In a preferred embodiment of the present invention, the Doppler channels are color coded sequentially over a rainbow spectrum such that a white noise background is produced in the plan position indicator. A microprocessor-based raster-type plan position indicator is also used so that the target returns appear as tracks.

It is an advantage of the present invention that the color display enhancement improves target detection by the operator. Thus, an operator is dramatically alerted under various threat scenarios, and this is particularly important in point-defense-type scenarios. This is an improvement over current designs where only the brightness of the target is viewed.

It is also an advantage of the present invention that high-Doppler targets are selected to be displayed in red. Thus, for close-in point-defense such a missile would be rapidly identified by an operator as a red radial track over several antenna scans, starting out as a single red arc of echoes with the first detected scan.

It is a further advantage of the present invention that the selection of the largest (signal plus noise) return over a bank of Doppler filters rejects noise in the other (non-chosen) filters and thereby improves detectability.

This particular advantage relates to the fact that the signal processing for the Doppler-coded color display is a coherent technique, whereas the signal processing for a monochrome display is noncoherent. In effect, with the color display, a sequence of N echo pulses is filtered by an FFT to subdivide the expected range of Doppler frequencies into N sub-bands. A target signal in one of these sub-bands competes with noise power that is reduced by a factor of N. When the filter output is displayed in a specific color, such as red, each red dot is characterized by a signal-to-noise ratio enhanced by a factor of N. (Occasional selection of an incorrect filter containing noise alone will add back a small amount of noise to the overall color display.)

By comparison, if a monochrome display were used, each of the N pulses of the sequence would be displayed directly without the benefit of Doppler filtering, so the noise per pulse would be N times larger than that of a color-coded dot on the color display. However, in the monochrome display, all N dots would be displayed, and the operator's eye will provide a visual integration of the line of N dots which, in the low signal-to-noise ratio case, gives an improvement in signal-to-noise ratio by a factor of approximately than $\sqrt{N}$, as in the color display.

Other features and advantages of the present invention are stated in or apparent from a detailed description of a presently preferred embodiment of the invention found hereinbelow.

BRIEF DESCRIPTION OF THE DRAWING

The single figure schematically depicts a portion of an emulated plan position indicator with various pixel colors depicted with a letter designation.

DETAILED DESCRIPTION OF THE PREFERRED EMBODIMENT

As a means for comparison with the enhanced target viewability on a radar plan position indicator according to the present invention, a non-coherent monochrome display will first be considered. Thus, assuming a radar signal with a pulse width ($\tau$) and a pulse repetition frequency (PRF) of $f_r$, let A be the amplitude of a received sinusoid. For a matched radar receiver, the per-pulse signal-to-noise ratio (SNR) is $$SNR = E/N_o = A^2\tau/2N_o.$$

where $N_o$ is the system noise power spectrum density.

If the dwell time is $T_d$, then there are $f_r T_d$ pulses in an arc of echoes. Assuming, for low SNR, that the effective side-by-side integration efficiency (due to visual integration over an arc) is such that SNR improves approximately by the square root of $f_r T_d$, then the effective SNR for an arc of echoes detecting a target is $$SNR_d = \sqrt{f_r T_d}\, A^2 \tau / 2 N_o.$$

Now, in accordance with the present invention, assume the same received signal but with coherence and a different signal processing procedure used as a part of the present invention. Let $T_b$ be the coherent processing interval over a burst. Since the processing is now coherent, each burst is part of the same sinusoid, and the bursts add in phase without destruction. The matched-receiver SNR per burst is increased proportionately with the number of pulses $f_r T_b$, rather than the square root of this number so that:

$$SNR_d = E/N_o = f_r T_b A^2 \tau / 2 N_o,$$

where $f_r T_b$ is the number of pulses per burst. The signal processing technique of the present invention consists of selecting the largest-amplitude Doppler filter over an unambiguous extent of Doppler frequencies, color coding this Doppler filter output, and displaying the selected and color coded Doppler filter outputs. The effective SNR is given approximately by the above equation, except that some degradation in SNR occurs due to the fact that the system is not an exact implementation of a matched receiver because the signal in the largest-amplitude Doppler filter of a burst is displayed rather than a coherent addition of the pulses.

In the arc of echoes, there are $T_d/T_b$ burst lengths that further enhance SNR by $\sqrt{T_d/T_b}$ during the dwell because of side-by-side integration of the outputs. This improvement is less efficient because the signal is not coherent between bursts. Thus, the effective SNR in this coherent (within the burst)/non-coherent (between bursts) case with four coherent bursts—each of length $T_b$, producing a total dwell time $T_d$—is given approximately by $$SNR_d = \sqrt{T_d/T_b}\, f_r T_b A^2 \tau / 2 N_o = f_r \sqrt{T_d - T_b}\, A^2 \tau / 2 N_o.$$

The advantage in the coherent approach is $$SNR_d/SNR_d = \sqrt{f_r T_b} = \sqrt{N},$$

where N is the number of pulses per burst.

If an 8-point fast Fourier transform (FFT) is used for Doppler filtering, the SNR enhancement of the coherent color approach over the non-coherent approach is $$\sqrt{N} = \sqrt{8} = 4.5 \text{ dB}.$$

It should be appreciated that the improvement in detectability comes from the use of coherent processing in Doppler channels as discussed above, with color being one preferred way to present the enhanced results visually to a radar operator. In the situation of a close-in, quick-reaction scenario, the detection scheme of the present invention could also be automated, with the operator serving as a backup.

Considering an application involving a close-in point-defense radar, an X-band radar for good low-elevation coverage close to the sea surface is used. Normally, for unambiguous range out to 50 nmi, the PRF of such a radar would be on the order of $f_r = 1620$ pps. For an X-band radar at 8 GHz, the maximum unambiguous radial velocity is only $$V_m = \lambda f_r/2 = 59 \text{ knots},$$

where $\lambda$ is wavelength (3.75 cm). With an 8-point FFT, each Doppler filter (resolution) then covers only $59/8 = 7.4$ knots. This PRF of 1620 pps which gives unambiguous range out to 50 nmi is too low to give a useful unambiguous Doppler in a useful Doppler resolution.

To achieve unambiguous Doppler up to 2500 knots, for example, a PRF of 68,644 pps is required. The velocity resolution associated with FFT's of various lengths for a PRF of 68,644 pps using X-band radar is as follows: 8-point FFT, 312 (2500/8) knots; 16-point FFT, 156 (2500/16) knots; 32-point FFT, 78 (2500/32) knots; and 64-point FFT, 39 (2500/64) knots. These associations are useful to evaluate what kind of rejection is obtained in the zero-Doppler filter. The number of colors required for a display need not be equal to the total number of Doppler filters, since a single color can be used over a number of contiguous Doppler filters as discussed below.

With a PRF of 68,644 pps, which is high enough to give unambiguous velocity up to 2,500 knots, the unambiguous range is now only 1.2 nmi, corresponding to 14.6 microseconds between pulses.

Considering an X-band radar as discussed above, the X-band has a PRF of 68,644 pps for unambiguous Doppler up to 2500 knots. The pulse repetition interval (PRI) is 14.6 $\mu$s for a range ambiguity of 1.2 nmi. Scan period is 1 sec. for 360° of azimuth coverage. For a 3° azimuth beam width (2.4 feet horizontal antenna width), the dwell time is 8.3 ms, giving 571 pulses per dwell. Assuming a 1 microsecond pulse duration for a duty factor of 0.068 and a 32-point FFT with associated rejection in the zero-Doppler filter of returns up to 78 knots, there are then 17 bursts of N=32 pulses per dwell and the improvement in SNR detectability over a non-coherent monochrome system is $\sqrt{N}$ corresponding to $$10 \log_{10} \sqrt{32} = 7.4 \text{ db}.$$

If five colors are then selected for use, the 31 Doppler filters (excluding the zero-Doppler filter) are colored with six contiguous filters per colors—e.g., red, orange, blue, green, and yellow.

The X-band radar signal waveform as mentioned above is range-ambiguous at 1.2 nmi intervals. If an FFT is to be done at every range cell, only about 14 (14.6/1 $\approx$ 14 for 1 microsecond pulses during a 14.6 microsecond PRI) unambiguous range cells are available. Distant targets are thus seen as multiple-time-around returns. If a target is found in one of the Doppler filters of one of the 14 unambiguous range cells, it has to be painted on the display every 1.2 nmi in range since true range is not known. However, by phase-coding each group of 32 pulses (e.g., pseudorandomly), and decoding on reception, followed by an FFT, the range ambiguity is increased to 38.4 nmi. The decoding process is automatically part of a matched-receiver processing, which can be implemented in various ways as known in the art.

Consider now as an example L-band radar, which would be more appropriate for wider-coverage volume search than the previously considered X-band radar. High-dive-angle targets have a high velocity; thus, a higher unambiguous radial velocity should be provided, for example up to 4,000 knots. At a nominal carrier frequency of 1 GHz ($\lambda = 1$ foot), the required PRF is then $$f_r = 2V_m/\lambda = 13,502 \text{ Hz}.$$

The PRI is then 74.06 microseconds, corresponding to an unambiguous range of 6.09 nmi. The velocity resolution associated with FFT's of various lengths is as follows: 64-point FFT, 500 knots; 128-point FFT, 250 knots; 256-point FFT, 125 knots; and 512-point FFT, 63 knots.

Assuming a 5 microsecond pulse width, the duty factor is again 0.068, as with the X-band radar example described previously. To extend the range-ambiguity level from 6.0 nmi, a pseudorandom phase code over 16 pulses would yield a range ambiguity of 96 nmi. This code is repeated 16 times per burst to yield a 256-pulse burst. Assuming a scan period of 3 seconds for 360° of azimuth coverage, a 4.6° azimuth beam width has a dwell time of 38.3 ms giving 518 pulses per dwell. By using a 256-point FFT with a radial-velocity resolution of 128 knots, there are two coherent bursts per dwell and the improvement in SNR detectability over a non-coherent monochrome system is $\sqrt{256}$, corresponding to 16 dB. Thus, if five colors are used, the 255 Doppler filters (excluding the zero-Doppler filter) are coded with 51 contiguous filters per color.

To demonstrate the use of color-coded Doppler for improved detectability according to the present invention, data from an L-band radar was used in an emulation. Initially, for convenience, this data was illustrated in a matrix array for a portion of the recorded high- and low-band data for a first antenna scan. In the radar used, the horizontal axis represented the range from range cell 1 to range cell 100, and the vertical axis represented the azimuth angle, typically from 96.03° to 100.38° (for coverage over 4.35°). Also indicated for each azimuth angle was the range cell having the largest amplitude. The signal detection in most cases was determined by a SNR threshold setting, which are primarily determined by the radar probability of false alarm. The threshold values can also be varied when the display is viewed by a human operator, as known to those of ordinary skill in the art.

For the purpose of this data analysis, the received signal magnitude threshold was set low enough to reveal noise background in a uniform background of dot symbols. The received signal at any range cells was assigned a symbol, with a blank representing a relatively weak signal whose relative amplitude was less than 1 and other symbols representing magnitudes of 1 to 2, 2 to 3, 3 to 4, and greater than 4. Using these symbols, a continuation of many of the higher order magnitude symbols formed in a vertical axis was seen to represent a target over a number of particular range cells and at a starting azimuth for the high-band data. However, the amplitude of the echo signals was weak for the low-band data and the target was not easily seen.

Then, in accordance with the present invention, the data was further processed by an 8-point FFT. Intermediate computer files containing a 4-dimensional radar data was established and consisted of 8 Doppler filter outputs spanning a 100-range-cell by 15-azimuth-cell plane for all 98 scans. The Doppler filter processing is described by the following equation:

$$d_k(R,\Theta) = \sum_{m=0}^{N-1} x_m(R,\Theta) e^{-j2\pi km/N},$$

where
$x_m(R,\Theta)$ is the complex radar data,
R is the range,
$\Theta$ is the azimuth angle,
k is the Doppler filter output (k=0, 1, 2, ... N−1), and
N is the total number of points taken for FFT (or the pulses/burst).

The outputs of the 8 Doppler filters were processed from the received high- and low-band data of antenna scans 2 and 3. For the high-band data, the echo signals had relatively high signal strength and the target was clearly visible by the higher magnitude symbols used (in this subsequent case 8 symbols up to magnitudes greater than 8), particularly where the large amplitude of all 8 filters excluding the zero-Doppler filter were formed into a rectangular box (matrix) array. This two-dimensional box array consisted of 44 range cells, from range cell 10 to range cell 53, and 15 azimuth cells ranging from azimuth 1 through azimuth 15. The target response was spread over several range cells because of pulse compression side lobes, but it could be recognized by the continuity of dark symbols or tracks in the vertical axis of the matrix.

The determination of precise target velocity required the application of numerous Doppler filters or FFT processors. Advanced analysis by using beam splitting techniques could also be applied to approximate target position within the radar mean width. For each antenna scan, a 100-range-cell by 15-azimuth-cell region or a space of approximately 20,000 feet times 4.35° (azimuth angle from 96.03° to 100.38° ) was resolved. In this resolvable space, the target velocity and position was determined by using a continuity test and threshold test algorithms as follows.

The continuity test was used to determine the start and end of the arc of echoes indicative of the target. The continuity of range cells is checked by applying a sequential search method. The azimuth serves as a sequential index number in ascending order. From the starting azimuth, the "registered" range cell, that is with the largest amplitude, is compared with that of the next azimuth. If they are not the same range cell, the first one is skipped and the comparison process is continued until a pair of the same range cells occurs. This continuity test also applies to the registered Doppler filter outputs, but only if the majority test described below fails.

With all identical range cells collected in the continuity test, those range cells are then eliminated having all signal amplitudes less than an appropriate threshold value, for example 2.0. In this threshold test, a new counter is generated to renumber the remaining azimuth angles. Consequently, the target position may be determined as $$\Theta = (\Theta_1 + \Theta_n)/2,$$

where $\Theta_1$ and $\Theta_n$ are the first and last azimuths.

To determine the target velocity, the majority test was applied by choosing the Doppler having the majority of candidate Doppler filters. In some cases, if the majority test fails because there is no unique majority Doppler, the continuity test to the Doppler filter outputs corresponding to those range cells obtained from the threshold test may be applied. The target velocity can then be obtained from the continuity selected Doppler filter output. This is calculated by the following equation:

$$V_k = V_{df}(\text{Doppler filter no., k}),$$

where $V_{df} = (\frac{1}{2}) \lambda \Delta f$, $\Delta f = \text{PRF}/N$, and N is the total number of Doppler filters (or cells, which in an FFT operation must be equal to the number of pulses/burst).

Using the recorded data processed by an 8-point FFT yielded f=1,400 MHz, PRF=833.3 Hz, and N=8. The target velocities corresponding to the Doppler filter outputs were calculated in knots according to the above equation and arbitrarily assigned color codes as follows: Doppler filter No. 1, velocity 23.4 and color code yellow (Y); Doppler filter No. 2, velocity 46.7 and color code green (G); Doppler filter No. 3, velocity 70.1 and color code blue (BL); Doppler filter No. 4, velocity 93.4 and color code orange (O); Doppler filter No. 5, velocity 116.8 and color code red (R); Doppler filter No. 6, velocity 140.1 and color code violet (V); and Doppler filter No. 7, velocity 163.5 and color code brown (BR).

As an intermediate step of data reduction for the recorded data of the antenna scan 1, the largest magnitude among 100 range cells in each azimuth was selected. For each azimuth, the range, magnitude and Doppler filter output were also determined. In the manner previously described, azimuth angles No. 1, 13, 14, and 15 were eliminated through both the continuity test and the threshold test algorithms. The azimuth angle was reordered to yield an average of the first and last of the remaining azimuth angles, corresponding to azimuth angle 7. Furthermore, the fifth Doppler filter output results from applying the majority test to the corresponding Doppler filter output candidates. With this analysis, the target was considered to be located at azimuth 7 and range cell 59 with a velocity close to 116.8 knots (Doppler filter 5).

As indicated above, the target Doppler velocity is preferably color coded. The target Doppler velocity was divided into seven target velocity regions with each region represented by a different color ranging sequentially over a rainbow spectrum from yellow to brown for a slow- to high-speed object Thus, a white background is produced on the PPI display. An emulated PPI display is depicted in the figure, and demonstrates the use of a color-coding system for target velocity presentation. It should be appreciated that in this figure actual pixel colors have instead been depicted with a letter corresponding to the pixel color. However, in an actual display, the pixels would have the color indicated.

In the figure, the target is recognized by the continuity of Doppler filter outputs within 2 or 3 range cells in the azimuth direction. The target is, however, not shown very well in the first two antenna scans. The inbound target is distinctly determined by the axial track of 5 consecutive arcs of echoes. In the figure, the outermost arc of echoes 10a of scan 1 is followed by arc of echoes 10b of scan 2, and so on. The calculation of the largest signal is done in two steps: determining the position of the target by taking the largest signal amplitude among the seven non-zero Doppler cells in the same range cell, and then setting the threshold test to reject possible noise. In a depicted figure, the threshold was 1.75.

It should be appreciated that different threshold settings determine the density of various noise appearing in the display. In the depicted display, the middle sector is bordered by two radial lines 12 and 14 that span 4.35° in azimuth. There are also two adjacent sectors, 16, and 18, displaying only background noise. Sectors 16 and 18 occupy the same span of angle and range.

The emulated (computer simulated) PPI display shows that the received echo signal is relatively strong. However, the target is very well displayed even with a very low threshold setting. As a following analysis shows, the color coding technique can be applied for target detecting presentation even when the SNR is relatively weak. The SNR in dB is calculated as:

$$SNR = 10 \log [S^2/(\sigma_x^2 + \sigma_y^2)],$$

$$\text{where: } S^2 = \left[ (1/N) \sum_{i=1}^{N} S_i \right]^2,$$

$$\sigma_x^2 = (1/N) \sum_{i=1}^{N} x_i^2 - \left[ (1/N) \sum_{i=1}^{N} x_i \right]^2, \text{ and}$$

$$\sigma_y^2 = (1/N) \sum_{i=1}^{N} y_i^2 - \left[ (1/N) \sum_{i=1}^{N} y_i \right]^2.$$

N and $\overline{N}$ are the number of calculation samples, and $\sigma_x^2$ and $\sigma_y^2$ are the noise variances in the x and y coordinates at the output of the FFT. SNR at the FFT input is about 9 dB lower and is more representative of the value associated with a non-Doppler monochrome display.

The color-coding technique is influenced by various SNR levels. The signal amplitude obtained from the Doppler output can be reduced by dividing a constant factor throughout the entire range scan. However, it was found that targets are barely preservable when there is a negative SNR. Thus, only those targets having a positive SNR are easily viewable and it was concluded that the target with an SNR near 0 is the margin to be detected. As mentioned above, these SNR values are at the FFT output, the signals being detected near 0 dB would have an SNR of about −9 dB without the Doppler color processing.

While the present invention has been described with respect to exemplary embodiments thereof, it will be understood by those of ordinary skill in the art that variations and modifications can be effected within the scope and spirit of the invention.

We claim:

1. A method to enhance target detectability on a radar plan position indicator, the method comprising the steps of:

receiving coherent pulse-burst waveforms from a target so that at least one complete burst is included in each dwell of a scanning surveillance fan beam;

performing a fast fourier transform on each returned coherent burst to form Doppler channels in predetermined range cells;

selecting the largest signal from the Doppler channels in each range cell;

color coding the selected signals of the Doppler channels; and displaying the color coded signals on the plan position indicator; and wherein numerical values of target velocity and position are determined including the steps of: checking a continuity of range cells by comparing a selected Doppler channel having a largest amplitude in a range cell with that of a next azimuth to determine if both channels are the same and determining the start and end of a target arc of echoes by noting any adjacent pairs of same Doppler channels.

2. A method to enhance target detectability as claimed in claim 1 wherein the Doppler channels are color coded over a rainbow spectrum such that a white background is produced on the plan position indicator.

3. A method to enhance target detectability as claimed in claim 1 wherein the target images appear as tracks.

4. A method to enhance target detectability as claimed in claim 1 and further including the step of eliminating any range cells having less than a predetermined threshold.

5. A method to enhance target detectability as claimed in claim 4 and further including the step of determining a best target position by averaging the position of the whole target arc of echoes.

6. A method to enhance target detectability as claimed in claim 6 and further including the step of determining target velocity by identifying a Doppler velocity represented by a majority of Doppler channels of the range cells of the target banana.

7. A method to enhance target detectability as claimed in claim 5 and further including the step of determining target velocity by comparing outputs of adjacent Doppler channels associated with the range cells of the target arc of echoes for two continuous range cells where the target velocity $V_k$ is calculated as follows:

$$V_k = V_{df}(\text{Doppler filter no., k})$$

where
$V_{df} = (\frac{1}{2}) \lambda \Delta f$
$\Delta f = (\text{pulse repetition frequency})/N$, and
$N = $ total number of Doppler filters.

* * * * *